United States Patent Office 2,912,062
Patented Nov. 10, 1959

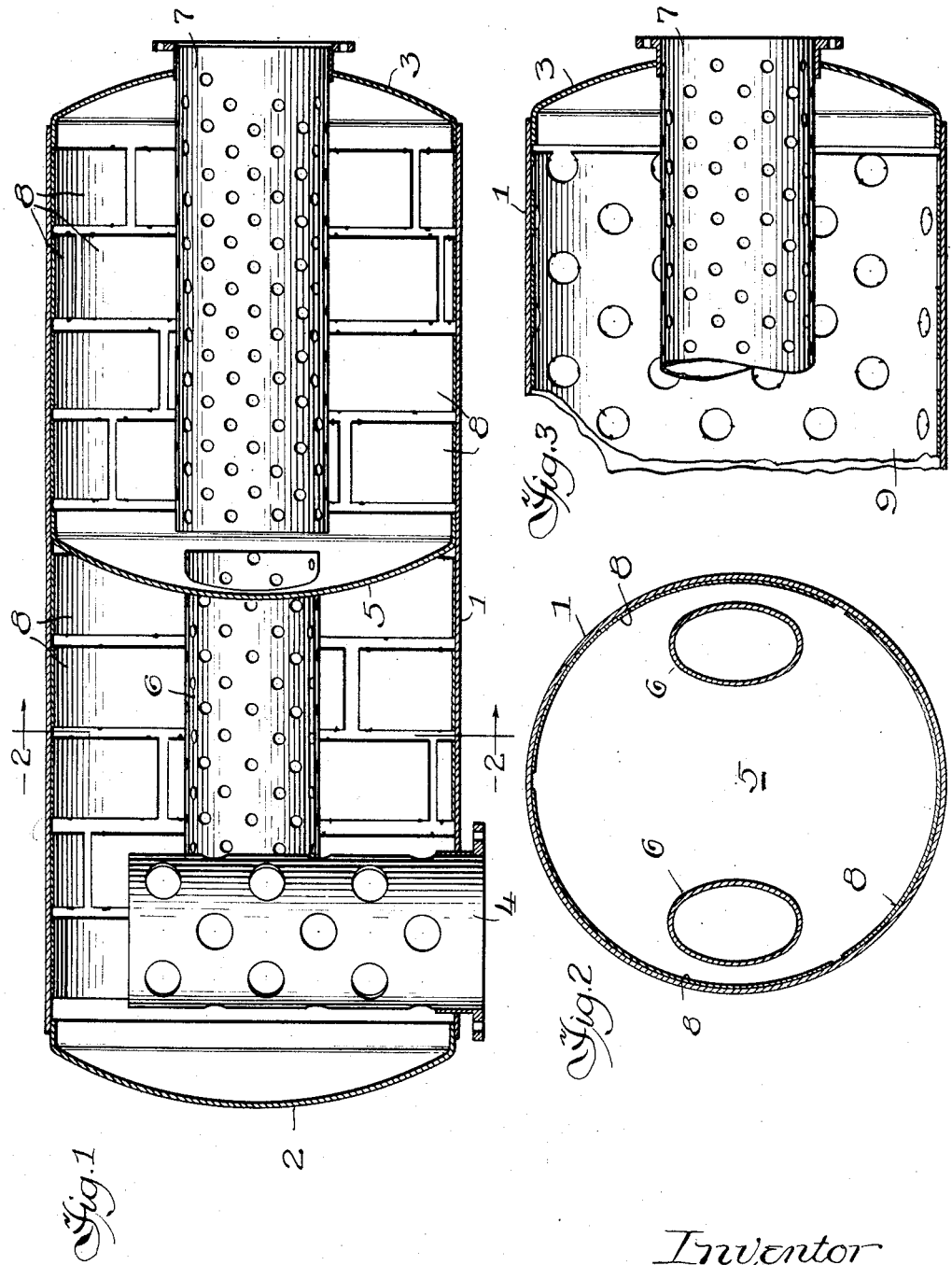

2,912,062
EXHAUST SNUBBER OR THE LIKE

Robert L. Hoyle, Libertyville, Ill., assignor to Burgess-Manning Company, Libertyville, Ill., a corporation of Illinois Application May 31, 1952, Serial No. 290,950

3 Claims. (Cl. 181—61)

This invention relates to exhaust snubbers or silencers, spark arresters, or similar equipment used in connection with engine exhaust or other pulsating gases, and is more particularly concerned with the damping of so-called "shell noise" resulting from the vibration of the shell or housing of such equipment.

It is well known that the impact of pulsating gases upon the casings which form the outer walls of exhaust snubbers, spark arresters, or the like tends to set the casing, or areas thereof, into vibration with resulting noise emanating therefrom. Since the primary function of snubbers and silencers is to minimize the noise resulting from the operation of an engine with which this equipment is associated, it is apparent that this purpose would be in part defeated if the shell noise is permitted to become a substantial factor contributing to the overall noise level. For the purpose of minimizing such shell noise, it has been the common practice to double-wrap the shell, that is, form the usually cylindrical shell by rolling the sheet metal from which it is fabricated completely around twice. The laminated wall thus formed has less tendency to vibrate than a casing wall formed from a single thickness of sheet metal.

A principal object of the present invention is to provide an exhaust snubber or the like having vibration damping means associated with the shell or casing thereof which more effectively dampens the natural tendency of the shell or casing to vibrate than structures heretofore known or used for this purpose. Subsidiary objects include the provision of shell damping means having advantages in weight and dollar economies over prior structures.

In the accompanying drawing,

Fig. 1 is a longitudinal sectional view of a typical exhaust snubber embodying one form of the improved vibration damping structure of the invention;

Fig. 2 is a cross-sectional view taken at line 2—2 of Fig. 1, and

Fig. 3 is a partial longitudinal view of the outlet section of the snubber of Fig. 1 embodying an alternative form of the vibration damping structure of the invention.

This invention is not directed or limited to the particular form of exhaust snubber illustrated in the drawing, but is applicable to the various types of equipment employed for silencing, spark arresting, or air cleaning purposes in pulsating gas systems. The particular snubber device shown is used by way of example only.

The snubber shown in the drawing comprises a cylindrical shell or casing 1 having end closures or headers 2 and 3. A perforated, open-ended inlet tube 4 passes through casing 1 and opens into a chamber formed within the casing and between end header 2 and intermediate header 5. A pair of open-ended perforated tubes 6 connect the two chambers on opposite sides of header 5, and a perforated, open-ended outlet tube 7 passes through a central opening in header 3.

For the purpose of damping vibrations in shell 1, sheet metal strips 8 are welded to the surface of the shell, as shown. While the dimensions of these strips are not critical from the standpoint of performance in damping vibration of the shell, it is generally desirable to use sheet metal which is lighter gauge than that employed for the shell itself. While the latter must be sufficiently strong to prevent rupture while the snubber it in use, such strength is not a controlling factor in the strips. Both weight and cost can be minimized by using scrap strips of thin metal for the shell damping means.

Strips 8 are rolled to the curvature of the shell and may be tack welded along their edges to the shell. Preferably, the strips 8 should not be wider than about twelve inches; if wider strips are used, provision should be made for welding the strips to the shell at distributed points intermediate the edges of the strips. The important thing is that the collection of strips 8 should be anchored, that is, firmly attached, as by welding, to the shell 1 at a multiplicity of distributed points. This is essential to the efficient damping operation of the structure. While the spacing between points of anchorage is not critical, a balance between performance and practical economy considerations suggests a spacing of approximately six inches. The points of anchorage may be considerably closer or somewhat farther apart without departing from the advantageous performance of the invention.

When so welded in position, the strips 8 are in substantial engagement with the shell; that is, while the surfaces may not be in actual continuous contact throughout the interface area, the surface-to-surface contact is as complete as may be under reasonable manufacturing tolerances.

Although strips 8 are arranged circumferentially in the form of the invention illustrated in Figs. 1 and 2, they may, if desired, be arranged to extend longitudinally. The strips may completely encircle the snubber chambers or may be provided in sectors of any convenient length.

In the modified form of the invention illustrated in Fig. 3, a substantially continuous inner shell 9 is employed in place of strips 8. For convenience in anchoring this inner shell 9 to shell 1, sheet metal stock having perforations spaced apart on approximately six to twelve inch centers may be used. The inner shell may then be conveniently tack-welded to shell 1 at the edges of the perforations. In this way, inner shell 9 is anchored to the outer shell at a multiplicity of distributed points to insure substantial engagement between these elements in accordance with the invention. As pointed out above in connection with the form of Figs. 1 and 2, shell 9 may be of lighter gauge than shell 1.

The structure herein described is quite dead, acoustically. It may readily be adapted to the various forms of equipment intended for the handling of pulsating gases without departing from the essence of the invention as defined by the appended claims.

Invention is claimed as follows:

1. In an exhaust snubber or the like having a metallic casing, means for damping the vibration of said casing comprising strips of sheet metal arranged collectively to cover a substantial part of the interior surface of said casing in substantial engagement therewith, said strips being anchored to said casing at a multiplicity of distributed points including spaced points along the edges of said strips.

2. Structure in accordance with claim 1 wherein said strips are spaced apart.

3. Structure in accordance with claim 1 wherein said casing is cylindrical and said strips are circumferentially arranged within said casing.

(References on following page)

References Cited in the file of this patent

UNITED STATES PATENTS

| | | |
|---|---|---|
| 1,402,896 | Schneebeli | Jan. 10, 1922 |
| 1,543,042 | Whitten | June 23, 1925 |
| 2,073,218 | Mordt | Mar. 9, 1935 |
| 2,151,084 | Deremer | Mar. 21, 1939 |
| 2,277,132 | Moss | Mar. 24, 1942 |
| 2,624,418 | Bourne | Jan. 6, 1953 |
| 2,661,073 | Deremer | Dec. 1, 1953 |

FOREIGN PATENTS

| | | |
|---|---|---|
| 435,423 | Great Britain | Sept. 20, 1935 |